United States Patent [19]

Braun

[11] Patent Number: 4,729,462

[45] Date of Patent: Mar. 8, 1988

[54] AUTOMATIC CLUTCH CONTROL SYSTEM HAVING LATCH MEMBER

[75] Inventor: Eugene R. Braun, Royal Oak, Mich.

[73] Assignee: Eaton Corporation, Cleveland, Ohio

[21] Appl. No.: 873,931

[22] Filed: Jun. 13, 1986

[51] Int. Cl.⁴ .................. F16D 43/284; F15B 15/26
[52] U.S. Cl. .................. 192/0.033; 192/85 C; 192/103 F; 192/114 R; 91/45
[58] Field of Search .............. 192/114 R, 91 R, 85 C, 192/0.033, 103 F; 188/265, 151 A; 303/89; 91/41, 45

[56] References Cited

U.S. PATENT DOCUMENTS

| Re. 29,913 | 2/1979 | Case et al. .................. 303/89 |
| 2,099,453 | 11/1937 | Searle .................. 303/89 |
| 2,180,154 | 11/1939 | Lenz .................. 192/114 R |
| 2,512,103 | 6/1950 | Hoffman et al. .................. 192/114 R |
| 2,527,458 | 10/1950 | Schurr .................. 192/114 R |
| 2,932,282 | 4/1960 | McKinley et al. .................. 91/45 |
| 3,214,998 | 11/1965 | Hall .................. 192/114 R |

FOREIGN PATENT DOCUMENTS 336428 4/1959 Switzerland .................. 192/85 C

Primary Examiner—Rodney H. Bonck
Assistant Examiner—David A. Testardi
Attorney, Agent, or Firm—D. A. Rowe; A. E. Chrow

[57] ABSTRACT

A control system (70, 70A) is provided that is particularly advantageous for controlling an automatic vehicular clutch. Linkage (23, 23A) for operating the clutch preferably includes a control arm (18, 18A) that is engageable by a latch member (20, 20A) that is driven by either a force actuator (37, 37A) and/or a speed signal (48, 48A) and is operable to hold the clutch in either the engaged or disengaged condition in the event of fluid pressure loss below or rise above a predetermined amount according to the type of clutch and other parameters.

16 Claims, 5 Drawing Figures

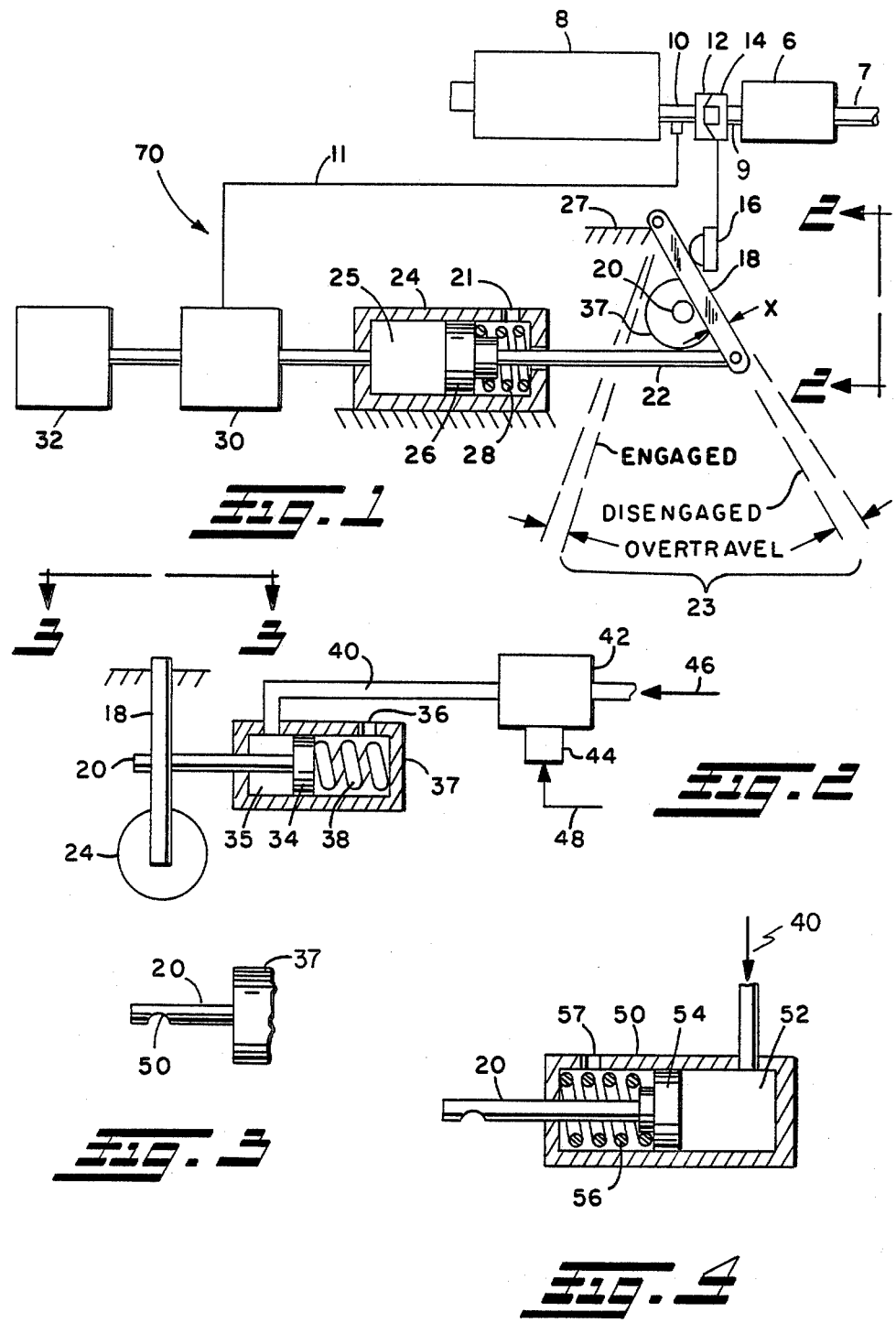

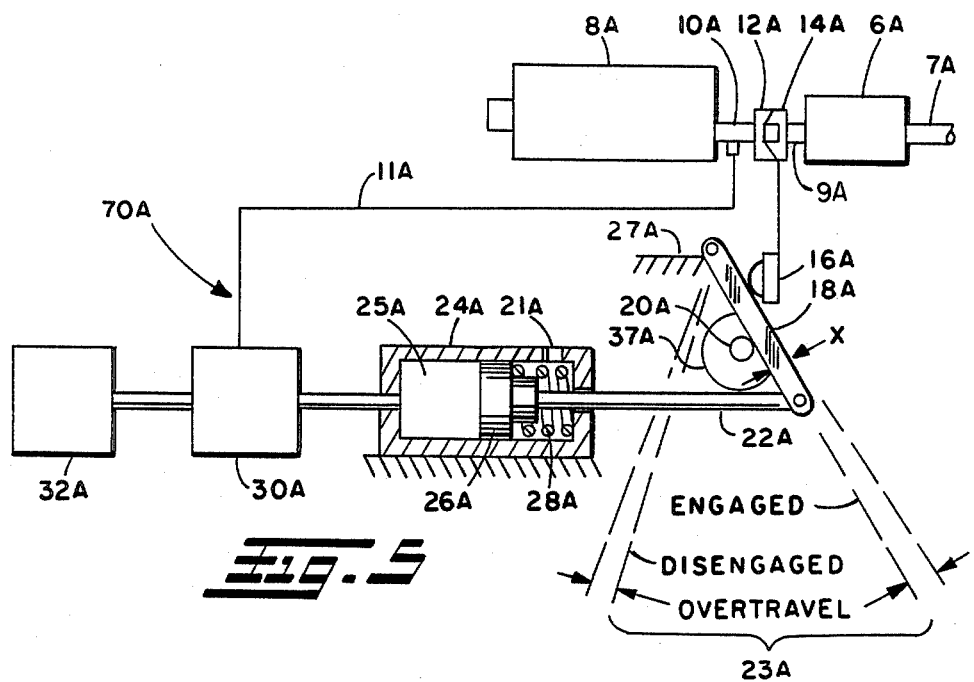

AUTOMATIC CLUTCH CONTROL SYSTEM HAVING LATCH MEMBER

INTRODUCTION

This invention relates generally to a clutch control system and more particularly to an improved clutch control system that includes a latch member which is operable to hold the clutch in a disengaged condition or an engaged condition in the event of a clutch actuator failure and which is particularly useful as a clutch for a vehicular automatic transmission.

BACKGROUND OF THE INVENTION

Automatically operated clutches particularly for use in conjunction with vehicular automatic transmissions have been known for many years.

Of particular interest to the present invention is the type of clutch, well known to those skilled in the art, that utilizes prescribed amounts of fluid pressure to effect and maintain the clutch in a released condition and which is automatically applied by means of a resilient biasing means such as a spring when the fluid pressure is reduced below a prescribed value or is otherwise lost due to a failure of some kind in the fluid pressure system.

Such clutches when used in conjunction with vehicular automatic transmissions are operative to apply and release the clutch according to a program of signals, commonly speed signals, which correspondly disengage and engage the transmission from a drive member such as the vehicle's engine crank shaft to enable automatic shifting between change gear ratios provided by the transmission and for vehicle starting.

One type of automatic clutch uses fluid pressure to keep the clutch disengaged. A major disadvantage of such a type clutch is that should the fluid pressure drop below the value required to keep the clutch disengaged, the clutch might engage without warning to the operator which may cause undesirable movement of a stopped vehicle.

Hence, a need exists for a means to keep the clutch disengaged upon loss of fluid pressure when the vehicle is stopped or below a low vehicle speed to prevent unexpected movement of the vehicle.

In another type of automatic clutch, fluid pressure is used to keep the clutch engaged. A major disadvantage of such type clutch is that should the fluid pressure for one reason or another decrease below the value required to keep the clutch in the engaged condition, the clutch is automatically released which disengages the transmission from the engine drive member and results in vehicle free-wheeling without the ability to utilize engine compression as an aid in braking the vehicle.

In view of the above, a need also exists to provide a means to maintain the clutch in the engaged condition under circumstances of fluid pressure loss so as to at least maintain engagement between the transmission and the engine drive member for purposes of insuring at least some degree of control and the ability to utilize engine compression as an aid in braking the vehicle. The means for maintaining a clutch, of the type herein described, in an engaged condition is provided by including a latch member in the clutch control system which is operable to provide such function and which is distinguishable from the latch member disclosed in my copending application Ser. No. 713,054, filed Mar. 18, 1985.

SUMMARY OF THE INVENTION

Accordingly, it is an object of this invention to provide an improved clutch control system for a fluid pressure disengaged clutch that is operative to maintain the clutch in a disengaged condition in the event of fluid pressure loss below that required to maintain the clutch in the disengaged condition which has an advantage on a vehicle when stopped.

It is another object of this invention to provide an improved clutch control system for a fluid pressure engaged clutch that is particularly advantageous for use with a vehicular automatic transmission that is operative to maintain the clutch in an engaged condition in the event of fluid pressure loss and thereby maintain engagement between the transmission and the engine which can be of advantage under driving conditions.

BRIEF DESCRIPTION OF THE DRAWINGS

FIG. 1 shows a block diagram of an embodiment 70 of the improved clutch control system for a spring engageable clutch of the invention;

FIG. 2 shows a right side view of a portion of a control 70 of FIG. 1;

FIG. 3 shows a partial top view of a fluid actuator 36 used in control system 70 of FIGS. 1 and 2;

FIG. 4 shows a longitudinal cross-sectional view through an alternate fluid actuator to fluid actuator 36 shown in FIGS. 1, 2 and 3; and FIG. 5 shows a block diagram of an embodiment 70A of the improved clutch control system for a spring disengaged clutch.

DESCRIPTION OF SOME PREFERRED EMBODIMENTS

An embodiment 70 of the clutch control system of the invention is shown in FIG. 1 controlling clutching between automatic transmission 6 and engine 8. Engine 8 rotates a drive member such as crankshaft 10 which is provided with a drive clutch plate 12 operable to drive input shaft 9 of transmission 6 by engagement between clutch plate 14 and clutch plate 12 according to a predetermined program of signals, such as speed signal 11 provided control system 70 corresponding to rotational speed of crankshaft 10, enabling automatic shifting of change gear ratios provided by transmission 6 for driving output shaft 7 of transmission 6 for driving, for example, vehicular drive wheels.

Clutch plate 14 is engaged with or disengaged from clutch plate 12 according to the position of control arm 18 of linkage 23 of system 70. In FIG. 1, control arm 18 is in the disengaged position which is the position at which clutch plates 12 and 14 are fully disengaged. Control arm 18 is able to engage clutch plates 12 and 14 by pressing against an actuator 16 which may be a mechanical or an electro-mechanical connection to the clutch assembly well known to those skilled in the art.

Control arm 18 is a moveable member and is preferably pivotably mounted at one end to a frame 27 which may be the transmission casing. The opposite end of control arm 18 is pivotably connected to piston rod 22 of first fluid actuator 24. Fluid actuator 24 is provided with an internal chamber 25 in which is slidably disposed piston head 26 to which rod 22 is secured. A first resilient biasing means such as coiled spring 28 is disposed in chamber 25 on the side of piston head 26 facing towards rod 22. Fluid actuator 24 is provided with a suitable port 21 in the region of spring 28 to prevent fluid compression from inhibiting movement of piston head 26 within chamber 25. A fluid control valve 30 receives fluid under pressure from fluid source 32 which may be, for example, the reservoir of a fluid pump driven by engine 8. The fluid may be either hydraulic or air according to the requirements of a particular application. Control valve 30 provides fluid under pressure to chamber 25 of fluid actuator 24 according to the program of signals 11 received. When it is desired to move control arm 18 to the disengaged position, the fluid pressure provided fluid actuator 24 is sufficient to overcome spring 28 and move piston head 26 and rod 22 towards the viewer's right which pivots control arm 18 into the disengaged position shown in FIG. 1. Typically, a fluid pressure of 40 psig. is sufficient to provide the fluid force required to overcome the counter force of spring 28. When it is desired to engage clutch plates 12 and 14 with each other, valve 30 is operable to reduce fluid pressure in chamber 25 which in turn enables spring 28 to overcome the fluid pressure resulting in piston head 26 and rod 22 moving towards the viewer's left and cause control arm 18 to pivot to the engaged position shown in FIG. 1.

The clutching function for which fluid pressure is operable to release the clutch and resilient biasing means operable to apply the clutch is well known to those skilled in clutch design. Although described as a piston, first fluid actuator 24 may be any fluid operated device that provides the movement required. Other types of force developing actuators besides a fluid actuator could also be used. Although shown preferably included in chamber 25 of fluid actuator 24, the first resilient biasing means such as spring 28 may be disposed at any location as long as it is operative to move control arm 18 from the disengaged to the engaged position as required.

It can be readily seen from FIG. 1, that loss or diminishing of fluid pressure below that required to maintain control arm 18 in the released position will enable spring 28 to move control arm 18 towards the engaged position which will result in engagement between clutch plates 12 and 14 and essentially couple engine 8 to transmission 6 which, in many instances, may be undesirable as previously described.

In order to prevent such coupling of the clutch plates, system 70 includes a latch member 20 shown in FIGS. 1–4. Latch member 20 is operable to engage linkage 23 and particularly control arm 18 in a manner effective to maintain control arm 18 in the released position when control arm 18 is in such position and fluid pressure is lost or otherwise diminished below a predetermined value.

As shown in FIG. 2, latch member 20 is operable to be moved into and away from engagement with control arm 18 by means of second fluid actuator 37. Preferably, latch member 20 is a piston rod secured to piston head 34 within chamber 35 of actuator 37. Second resilient biasing means such as coiled spring 38 is disposed in chamber 35 on the side of piston head 34 facing away from latch member 20. Actuator 37 is provided with a port 36 to prevent compression in the region of spring 38 from inhibiting movement of piston head 34 within chamber 35. Chamber 35 receives fluid pressure on the side of piston head 34 facing towards latch member 20, either directly from fluid source 32 or through a fluid control valve 42 hereinafter described. Under normal operating conditions, the fluid pressure within chamber 35 of actuator 37 is sufficient to overcome the counter acting spring force of spring 38 and move piston head 34 towards the viewer's right which causes latch member 20 to disengage from control arm 18. However, should fluid pressure be lost or diminished below a predetermined value within chamber 35 when control arm 18 is in the released condition, spring 38 is operable to move piston head 34 towards the viewer's left into engagement with control arm 18 in a manner effective to maintain control arm 18 in a released condition. Latch member 20 is then able to maintain disengagement between clutch plates 12 and 14 even though fluid pressure loss has occurred for one reason or another. When fluid pressure is restored to some predetermined level, the fluid pressure in chamber 35 of actuator 37 is operative to overcome the force of spring 38 and disengage latch member 20 from control arm 18 to the extent required to enable control arm 18 to move between the engaged and disengaged positions as required under normal operating conditions. Thus, the term "disengagement" as used herein with respect to the relationship between latch member 20 and control arm 18 does not require that they be completely separate from each other in the disengaged condition for they may actually remain engaged but not in a manner that would prevent control arm 18 from moving between the released and applied positions.

As in the case of actuator 24, actuator 37 may be any fluid operated actuator that is operable to engage and disengage latch member 20 in the manner herein described. Other types of force developing actuators besides a fluid pressure operated actuator could be used. Although preferably included within chamber 35, second resilient biasing means such as spring 38 may be located separately from actuator 37 provided it is operable to perform in the manner herein described.

System 70 preferably includes a fluid control valve 42 shown in FIG. 2 operative to receive fluid 46 under pressure for example from fluid pressure source 32. Fluid control valve 42 is controlled by a signal 48 which generally corresponds to rotational speed of a rotating member desired for use in control and which, in the case of FIG. 1, may be either the rotational speed of a selected member of engine 8 such as crankshaft 10 or input shaft 9 or output shaft 7 of transmission 6 or, if desired, a measurement of actual vehicle ground speed. Signal 48 may also be supplied by the automatic clutch and/or transmission control in response to various parameters and conditions.

Signal 48 is received by solenoid 44 which is operative to regulate fluid pressure 46 through fluid control valve 42 to provide fluid pressure 40 to chamber 35 of actuator 37. Fluid control valve 42 is operative to provide fluid pressure to actuator 37 such that, whenever signal 48 is at or above a predetermined value, the fluid pressure provided is sufficient to overcome spring 38 and cause disengagement between latch member 20 and control arm 18. Fluid control valve 42 is also preferably operable to diminish fluid pressure provided to the actuator 37 sufficiently to enable spring 38 to urge latch member 20 into engagement with control arm 18 to the extent required to maintain control arm 18 in the released condition whenever signal 48 is below a predetermined value. By use of fluid actuator 37, whether or not latch member 20 is able to maintain control arm 18 in the released condition becomes a function of signal 48. It will be noted from FIG. 2 that in the event of fluid pressure loss or diminishment below a predetermined value, such will be registered by actuator 37 resulting in engagement of latch member 20 and control arm 18 in the manner required to maintain control arm 18 in the clutch disengaged condition.

As shown in FIG. 3, latch member 20 may further preferably be provided with means for preventing disengagement of latch member 20 from control arm 18 until fluid pressure in chamber 25 of actuator 24 has increased to the extent required to move control arm 18 fully into the disengaged condition. Such may, for example, be provided by notch 50 in latch member 20 which is operative to hold the two together until control arm 18 has moved fully into the disengaged condition.

Control arm 18 may further preferably be provided with means for prohibiting latch member 20 from inhibiting its movement as long as fluid pressure in chamber 25 of actuator 24 is below the value required to enable actuator 24 to move control arm 18 into the disengaged condition. Such may be provided, for example, by control arm 18 having a configuration such as a width "X" as shown in FIG. 1 that is sufficiently broad to form a slide plate operative to block latch member 20 from interfering with the movement of the control arm 18 until the control arm 18 is in the disengaged position but which is preferably inoperable to prevent engagement therebetween when control arm 18 has moved past the disengaged position into the region of overtravel shown in FIG. 1.

In FIG. 4 is shown an alternate embodiment 50 of the second fluid actuator of system 70 where the role of fluid pressure and spring action are reversed. In FIG. 4, fluid pressure 40 is introduced into chamber 52 on the side of piston head 54 facing away from latch member 20 with a resilient biasing means in the form of spring 56 being disposed in chamber 52 on the side of piston head 54 facing toward latch member 20. The chamber containing the spring 56 has a vent 57. Spring 56 may be selected such that fluid control valve 42 of the system operates to engage latch member 20 with control arm 18 in a manner effective to maintain control arm 18 in the released condition as long as fluid pressure in chamber 52 remains slightly less by a predetermined amount than the fluid pressure required in chamber 25 of actuator 24 to move control arm 18 to the disengaged position otherwise spring 56 will begin to overcome the force of fluid pressure in chamber 52 and operate to disengage latch member 20 from control arm 18. Also, the previous variations described herein with respect to control system 70 pertain.

An embodiment 70A of the improved clutch control system of the invention for a spring disengaged clutch is shown in FIG. 5 controlling clutching between transmission 6A and engine 8A. Engine 8A rotates a drive member such as crankshaft 10A which is provided with a drive clutch plate 12A operable to drive input shaft 9A of transmission 6A by engagement between clutch plate 14A with clutch plate 12A according to a predetermined program of signals such as speed signal 11A provided control system 70A corresponding to rotational speed of crankshaft 10A enabling automatic shifting of change gear ratios provided by transmission 6A for driving output shaft 7A of transmission 6A for driving, for example, vehicular drive wheels.

Clutch plate 14A is engaged with or disengaged from clutch plate 12A according to the position of control arm 18A of linkage 23A of system 70A. In FIG. 5, control arm 18A is in the engaged position which is the position at which clutch plates 12A and 14A are fully engaged. Control arm 18A is able to engage clutch plates 12A and 14A by pressing against an actuator 16A which may be a mechanical or an electro-mechanical connection to the clutch assembly well known to those skilled in the art.

Control arm 18A is a moveable member and is preferably pivotably mounted at one end to a frame 27A which may be the transmission casing. The opposite end of control arm 18A is pivotably connected to piston rod 22A of first fluid actuator 24A. Fluid actuator 24A is provided with an internal chamber 25A in which is slidably disposed piston head 26A to which rod 22A is secured. A first resilient biasing means such as coiled spring 28A is disposed in chamber 25A on the side of piston head 26A facing towards rod 22A. Fluid actuator 24A is provided with a suitable port 21A in the region of spring 28A to prevent fluid compression from inhibiting movement of piston head 26A within chamber 25A. A fluid control valve 30A receives fluid under pressure from fluid source 32A which may be, for example, the reservoir of a fluid pump driven by engine 8A. The fluid may be either hydraulic or air according to the requirements of a particular application. Control valve 30A provides fluid under pressure to chamber 25A of fluid actuator 24A according to the program of signals 11A received. When it is desired to move control arm 18A to the engaged position, the fluid pressure provided fluid actuator 24A is sufficient to overcome spring 28A and move piston head 26A and rod 22A towards the viewer's right which pivots control arm 18A into the engaged position shown in FIG. 5. Typically, a fluid pressure of 40 psig. is sufficient to provide the fluid force required to overcome the counter force of spring 28A. When it is desired to disengage clutch plates 12A and 14A from each other, valve 30A is operable to reduce fluid pressure in chamber 25A which in turn enables spring 28A to overcome the fluid pressure resulting in piston head 26A and rod 22A moving towards the viewer's left and cause control arm 18A to pivot to the disengaged position shown in FIG. 5.

The clutching function for which fluid pressure is operable to engage the clutch and resilient biasing means is operable to disengage the clutch is well known to those skilled in clutch design. Although described as a piston, first fluid actuator 24A may be any fluid operated device or, more generally, actuator force means that provides the movement required and, although shown preferably included in chamber 25A of fluid actuator 24A, the first resilient biasing means such as spring 28A may be disposed at any location as long as it is operative to move control arm 18A from the engaged to the released position as required.

It can be readily seen from FIG. 5, that loss or diminishing of fluid pressure below that required to maintain control arm in the engaged position will enable spring 28A to move control arm 18A towards the disengaged condition which will result in disengagement between clutch plates 12A and 14A and essentially de-couple engine 8A from transmission 6A which, in many instances, may be undesirable as previously described.

In order to prevent such de-coupling of the clutch plates, system 70A includes a latch member 20A shown in FIG. 5. Latch member 20A is operable to engage control arm 18A in a manner effective to maintain control arm 18A in the engaged position when control arm 18A is in such position and fluid pressure is lost or otherwise diminished below a predetermined value.

Latch member 20A may in a similar manner to latch member 20, as shown in FIG. 2, be operable to be moved into and away from engagement with control arm 18A by means of second fluid actuator 37A which may also be any suitable actuator force means operable to move latch member 20A in the manner required.

System 70A preferably includes a fluid control valve 42A similar to fluid control valve 42 as shown in FIG. 2 which is controlled by a signal which may be either the rotational speed of a selected member of engine 8A such as crankshaft 10A or input shaft 9A or output shaft 7A of transmission 6A, a measurement of actual vehicle ground speed, or be supplied by an automatic clutch or transmission control.

Latch member 20A may be similar to latch member 20 shown in FIGS. 3 and 4 and be provided with means for preventing disengagement of latch member 20A from control arm 18A until fluid pressure in chamber 25A of actuator 24A has increased to the extent required to move control arm 18A fully into the engaged condition. Such may, for example, be provided by a notch in latch member 20A which is operative to hold the two together until control arm 18A has moved fully into the engaged condition.

Control arm 18A may further preferably be provided with means for prohibiting latch member 20A from inhibiting its movement as long as fluid pressure of chamber 25A of actuator 24A is below the value required to enable actuator 24A to move the clutch arm 18A into the engaged condition. Such may be provided, for example, by control arm 18A having a configuration such as a width "X" as shown in FIG. 5 that is sufficiently broad to provide a slide plate operable to block the latch member 20A from interfering with the movement of the control arm 18A until the control arm 18A is in the engaged position but which is preferably inoperable to prevent engagement therebetween when control arm 18A has moved past the engaged position into the region of overtravel shown in FIG. 5.

Although the present invention has been set forth with a certain degree of particularity, it is understood that various modification and substitution and rearrangement of the components are possible without departing from the spirit and scope of the invention hereinafter claimed.

What is claimed is:

1. An improved control system for an automatic clutch of the type including linkage operable to effect a condition of engagement or disengagement of the clutch by a first resilient biasing means and to correspondingly effect a condition of disengagement or engagement of the clutch by actuation of a first actuator force means operative to overcome said first biasing means, said improvement characterized by said control system including:

A moveable latch member;

second resilient biasing means operable to urge the latch member into a condition of engagement with or disengagement from the linkage;

second actuator force means operable upon actuation to overcome the second biasing means and correspondingly urge the latch member into a condition of disengagement from or engagement with the linkage; and control means controlled by a speed signal and operative to activate the second actuator force means such that, whenever the speed signal is at a predetermined value, the second actuator force means overcomes the second biasing means and causes engagement or disengagement of the latch member from the linkage thereby either maintaining the clutch in the condition of engagement or disengagement provided by actuation of the first force actuator means or enabling the linkage to move to effect engagement or disengagement of the clutch.

2. The control system of claim 70 wherein the control means is operative to deactivate the second actuator force means whenever the speed signal is below a predetermined value to the extent required to enable the second resilient biasing means to urge the latch member into engagement with the linkage in the manner required to maintain the clutch in the engaged or disengaged condition.

3. The control system of claim 1, including means for prohibiting the latch member from inhibiting movement of the linkage as long as the speed signal remains at a predetermined value.

4. The control system of claim 1 including means operative to prevent the latch member from engaging the linkage in the manner required to inhibit the movement thereof as long as the linkage is not in a position of overtravel past said clutch engagement or disengagement position.

5. The control system of claim 3 or 4 wherein said means comprises a blocking plate upon which the latch member slides.

6. The control system of claim 1 wherein said first and second actuator force means are fluid actuators.

7. The control system of claim 1 wherein the clutch is an automatic vehicular clutch.

8. An improved control system for an automatic clutch of the type including linkage operable to effect engagement of the clutch by a first resilient biasing means and to effect disengagement of the clutch by a first actuator force means operative to overcome said first biasing means, said improvement characterized by said control system including;

a moveable latch member, second resilient biasing means operative to urge the latch member into engagement with the linkage, second actuator force means when activated operative to overcome the second biasing means and disengage the latch member from the linkage, and control means controlled by a speed signal and operative to activate the second actuator force means such that, whenever the speed signal is above a predetermined value, the second actuator force means overcomes the second biasing means and causes disengagement of the latch member from the linkage enabling the linkage to move to effect engagement of the clutch.

9. The control system of claim 1 wherein the control means is operative to deactivate the second actuator force means whenever the speed signal is below a predetermined value to the extent required to enable the second resilient biasing means to urge the latch member into engagement with the linkage in the manner required to maintain the clutch in the disengaged condition.

10. The control system of claim 8 or 9 including means for prohibiting the latch member from inhibiting movement of the linkage as long as the speed signal remains above a predetermined value.

11. The control system of claim 8 including means for prohibiting the latch member from preventing movement of the linkage, said means provided by said linkage including a member having a configuration adapted to prevent the latch member from engaging the linkage in the manner required to inhibit the movement thereof as long as the clutch is not disengaged.

12. The control system of claim 8 wherein said first and second actuator force means are fluid actuators.

13. The control system of claim 1 including means operative to prevent the latch member from engaging the linkage in the manner required to inhibit the movement thereof as long as the linkage is not in a position of overtravel past said clutch disengagement position.

14. The control system of claim 13 wherein said means comprises a blocking plate upon which the latch member slides until the clutch is disengaged.

15. The control system of claim 8 wherein the clutch is an automatic vehicular clutch.

16. The control system of claim 5 wherein said means comprises a blocking plate upon which the latch member slides.

* * * * *